April 8, 1969     R. W. ROBBINS, JR     3,437,065
HYDRAULICALLY ACTUATED MERCURY TRIM SYSTEM
Filed Feb. 26, 1968     Sheet _1_ of 2

FIG. I.

INVENTOR
ROLAND W. ROBBINS, Jr.

BY

ATTORNEY

April 8, 1969   R. W. ROBBINS, JR   3,437,065
HYDRAULICALLY ACTUATED MERCURY TRIM SYSTEM
Filed Feb. 26, 1968

INVENTOR
ROLAND W. ROBBINS, Jr.

BY
ATTORNEY

United States Patent Office 3,437,065
Patented Apr. 8, 1969

3,437,065
HYDRAULICALLY ACTUATED MERCURY
TRIM SYSTEM
Roland W. Robbins, Jr., Arnold, Md., assignor to the
United States of America as represented by the Secretary of the Navy
Filed Feb. 26, 1968, Ser. No. 711,155
Int. Cl. B63g 8/26; B63b 43/06
U.S. Cl. 114—16                                        5 Claims

ABSTRACT OF THE DISCLOSURE

A hydraulically actuated trim system for transferring a fluid balancing medium for statically trimming a vehicle, for example, a submarine. The balancing medium is transferred between containers at opposite ends of the vehicle by pumping a second fluid from one container into the other and thus causing the balancing medium to flow in the opposite direction. A reversible pump is provided and mechanical valves responsive to the direction of flow of the second fluid provide the desired flow paths for both fluids.

---

The invention described herein may be manufactured and used by or for the Government of the United States of America for governmental purposes without the payment of any royalties thereon or therefor.

Background of the invention

This invention relates to a system for statically balancing a vehicle operating in a fluid environment. The system utilizes two fluids, each operating in a closed loop and the two loops being separated by flexible diaphragms. Liquid containers are provided at each end of the vehicle and the containers are separated into two compartments by the flexible diaphragms. When it is desired to change the static balance of the vehicle, the first or operating fluid is pumped from one container to the other. As the quantity of operating fluid in one container increases it forces the balancing fluid from that container into the container at the opposite end through deformation of the diaphragms. Typically the operating fluid is oil and the balancing fluid is mercury.

The prior art systems of this type have utilized a unidirectional pump and motor and required a plurality of complex electrically operated valves to transfer the operating and balancing fluids from one container to the other.

The present system, by providing a reversible pump and motor, allows the use of simple, fluid-actuated valves instead of complex electrically operated valves. The operator needs only to select the direction in which the balancing fluid is to be moved. The mechanical fluid operated valves respond to the direction of fluid flow and automatically provide a proper path for the actuating fluid in order to accomplish the desired result.

Summary of the invention

The invention described herein provides a simple, reliable and inexpensive fluid actuated trim system for a vehicle operating in a fluid environment. To accomplish the desired trim it is only necessary for the operator to select the direction of trim required and the valves, directing the fluid flow, respond to the direction of fluid flow selected to provide the proper path for the actuating and balancing fluids.

It is therefore an object of this invention to provide a system for transferring a first fluid by pumping a second fluid.

It is a further object of this invention to provide a simple and inexpensive fluid actuated trim system for a vehicle.

Another object of the invention is to provide a fluid actuated trim system in which fluid flow is directed by pressure actuated valves.

Other objects and many of the attendant advantages of this invention will be readily appreciated as the same becomes better understood by reference to the following detailed description when considered in connection with the accompanying drawings.

Description of the preferred embodiment

Figure 1:
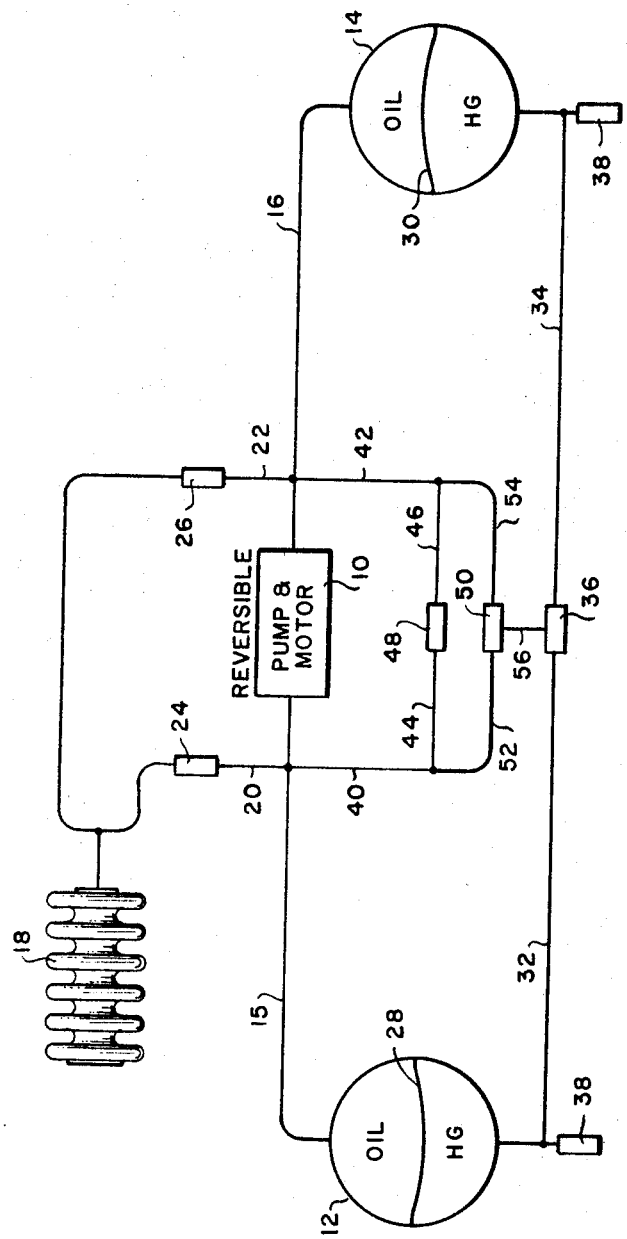
FIG. 1 is a mechanical schematic diagram of a system according to the invention.

Referring now to the drawings, there is shown in FIG. 1 a schematic diagram of the system. The system is a two fluid closed loop system which comprises a first loop portion for an actuating fluid and a second loop portion for a balancing or trim fluid.

In the actuating fluid loop portion there is provided a reversible hydraulic pump and motor 10 which is connected to two fluid containers 12 and 14 through conduits 15 and 16. The containers 12 and 14 may be located at opposite ends of the vehicle to be trimmed or balanced. The pump is also connected in parallel to a storage or makeup reservoir 18 containing the actuating fluid such as air, oil or water fluidly coupled via conduits 20 and 22. In the conduits 20, 22 respectively connecting the pump and the reservoir there are provided normally open check valves 24 and 26 respectively. Each of the fluid containers is divided into upper and lower compartments by a flexible diaphragm. These diaphragms are shown at 28 and 30 for the respective containers 12, 14.

The lower half of each container beneath its diaphragm contains a predetermined amount of a heavy balancing fluid, for example, mercury. This balancing fluid loop portion comprises conduits 32 and 34 which are connected to the lower halves of containers 12 and 14, respectively, and which are joined at a pressure actuated two-way valve 36. In this heavy fluid portion of the system there is also provided a dumping valve 38 for each container which is used to dump the balancing fluid if a rapid lightening of the vehicle is required in an emergency.

Referring once again to the actuating fluid portion of the system, there is connected in parallel with the pump and motor a double acting relief valve 48 which is connected to opposite ends of the pump through conduits 40, 42, 44 and 46. Also, in parallel with the pump and motor is a pilot flow guide valve 50 connected to the opposite ends of the pump by conduits 52 and 54. The pilot flow guide valve 50 is connected to the pressure actuated valve 36 by a conduit 56.

Figure 4:
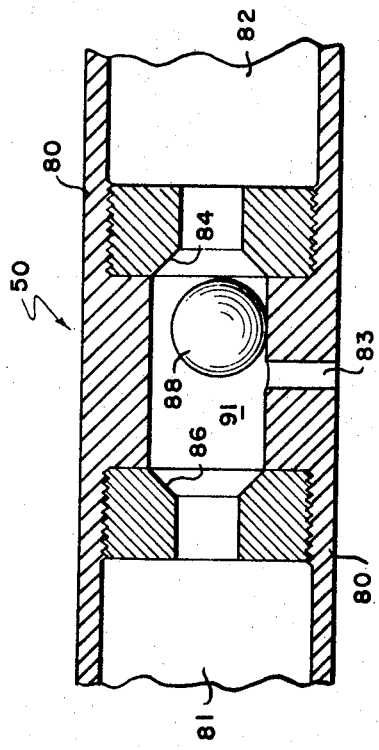
FIG. 4 is a view in cross section of the pilot flow guide valve.
Figure 3:
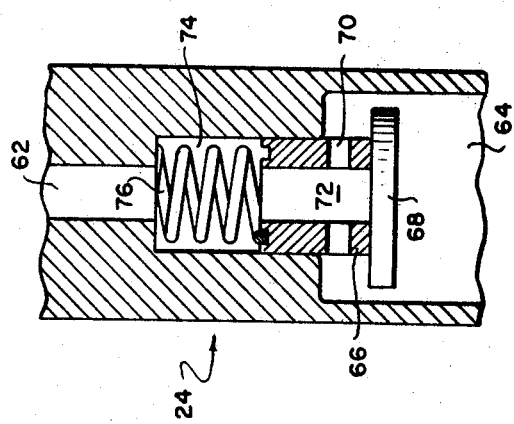
FIG. 3 is a view in cross section through the normally open check-valve according to the invention.

The operation of the system in connection with pumping of the balancing fluid from container 12 to container 14, is as follows:

The reversible pump 10 is energized in a direction so as to pump oil from container 14 to container 12, thus creating a higher pressure in conduit 20 than in conduit 22 connecting the pump to the reservoir 18. The pressure in conduit 20 causes normally open check-valve 24 to be activated to the closed position. As seen in FIG. 3, the check valve 24 is composed of a housing 60 having an inlet opening 64 and an outlet 62. Interposed between the inlet and outlet is a chamber 72 which contains a piston 66 slidable within a chamber 74. The piston contains a cross hole 70 connecting with an internal central bore 72 which is in communication with the inlet and and outlet openings. When high pressure is applied at the inlet 64, pressure acting on the head 68 of piston 66 forces the piston upward against the spring 76 closing ports 70, thus blocking communication between openings 62 and 64. If high pressure is applied at opening 62, flow through the valve is unobstructed. Check valve 26 is identical in construction to check valve 24 and operates in the same manner. Thus it can be seen that high pressure applied to conduit 20 closes check valve 24 but check valve 26 remains open and allows communication between reservoir 18 and the low pressure side of pump 10. With the pump running in the direction indicated above, there is also created high pressure in conduits 40 and 52 which activates the pilot flow valve 50. There is shown in FIG. 4 the detailed construction of the valve 50 which comprises a housing 80 having openings at each end and a channel 91 of reduced cross section connecting the end openings. Extending transversely from channel 91 through the housing 80 is an output channel 83. There is also contained in channel 91 a ball member 88 of a diameter less than that of channel 91 which is free to move along the length of the channel. At each end of the channel there are provided ball seats designated 84 and 86. Thus it can be seen that with high pressure applied at either end of valve 50 the opposite end will be closed by ball 88 seating in the appropriate ball seat and a high pressure output will be obtained at opening 83.

In the system operation outlet 83 connects with conduit 56 of FIG. 1, which provides high pressure fluid to the conventional pressure activated two-way valve shown at 36. When pressure is applied to valve 36, the conduit path between the lower compartments of containers 12 and 14 containing mercury are fluidly coupled via conduits 32, 34, and the mercury may flow freely between the containers enabling balancing or trim of the vehicle.

Figure 2:
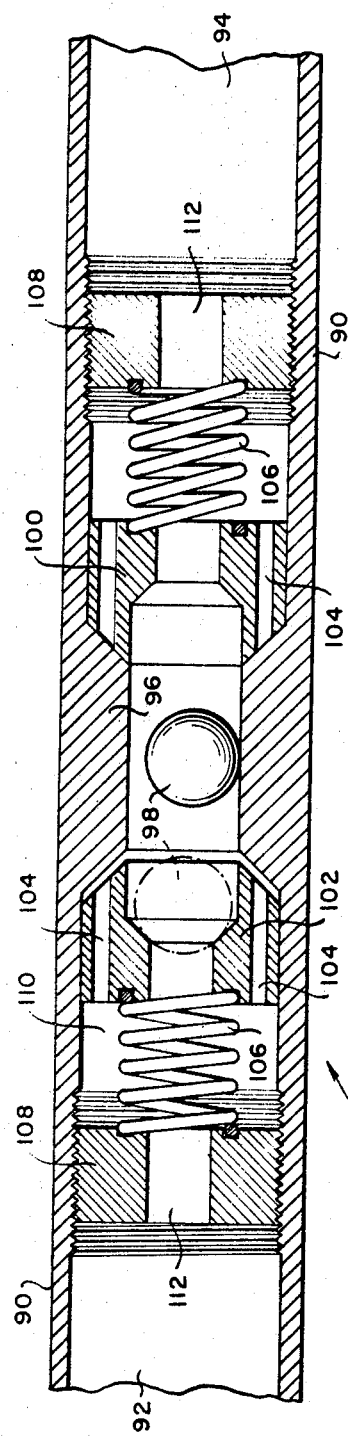
FIG. 2 is a view of a cross section through the double acting relief valve according to the invention.

The double acting relief valve shown at 48 in FIG. 1, connected in parallel with the pump and motor, is shown in detail in FIG. 2. This valve acts to relieve an overpressure condition in the system which could damage the diaphrams in the containers and also acts to equalize pressure in the upper compartments of the chambers when the pump is de-energized.

The construction of the relief valve is similar to that of the inlet flow valve 50 but includes means for relieving an over pressure condition. Referring now to FIG. 2, there is shown valve 48 having a housing 90 with openings at opposite ends designated 92 and 94. These openings are connected by a reduced diameter channel 96 in the center of the valve 48. There is assembled in channel 96 a spherical ball 98 of a diameter slightly smaller than that of channel 96. At each end of this channel there are provided slidable pistons 100 and 102. Each piston has a central opening extending through the length of the piston and a conical ball seat at the end of the piston nearest channel 96. Additional openings 104 are provided near the outside edge of the pistons. The piston is biased toward the channel 96 by means of spring 106 which bears against one end of the piston and against a plug member 108 which is threaded into the housing 90.

This valve operates in the following manner:

With high pressure applied at opening 94 of valve 48 it can be seen that fluid will flow through the central opening into channel 96 and cause the ball 98 to seat in the ball seat of piston 102 and block further flow. As the pressure is increased the fluid acting against the ball and the piston will force the piston against the spring pressure and move it away from the end of channel 96. As the piston moves away from the end of the channel the openings 104 provide a fluid path through the piston into chamber 110 between the plug member and the piston and out opening 92 through opening 112 in the plug member thus relieving the pressure applied at 94. When high pressure is removed, piston 102 will move to its rest position against the end of channel 96 and the pressure between the two openings will be equalized by movement of ball 98 away from its ball seat.

Thus it can be seen that by selecting the direction of flow for the actuating fluid the check valve at the low pressure side is opened and the valve on the higher pressure side is closed. The pilot flow valve 50 directs high pressure fluid to the two way valve 36 thus opening the conduit path for transferring the balancing fluid. If the pressure in the actuating fluid loop should exceed a predetermined amount relief valve 48 will automatically bypass a portion of the fluid and maintain the pressure below the predetermined level. When the pump is de-energized high pressure is removed from valve 50 and valve 36 automatically closes to close the conduit between the lower portions of the containers containing the balance fluid. Relief valve 48 then acts to equalize the pressure in the actuating fluid compartments of the containers.

Thus it can be seen that there is herein provided, according to the invention, a simple fluid transfer system by which a first fluid in a closed loop portion may be transported by the pumping of a second fluid in a second closed loop portion, the separated fluids together acting to provide a closed loop. Such a system may be employed wherever the fluid to be transported is highly corrosive or must be maintained at an exceedingly high or low temperature which conditions are unsuitable for passing the working or balancing fluid through a pump.

Obviously many modifications and variations of the present invention are possible in light of the above teachings. For example, the diaphragms are not essential since oil and mercury are immiscible and the system may be operated in the same manner as described herein without compromising its operation.

It is to be understood that the invention is not limited to the exact details of construction shown and described, for obvious modifications will occur to persons skilled in the art.

What is claimed is:
1. A hydraulic balancing system for a vehicle comprising:
   an actuating fluid;
   a balancing fluid having greater density than said actuating fluid;
   first and second containers mounted at respective opposite ends of said vehicle for containing a portion of each of said fluids in each container;
   first and second flexible diaphragms separating said fluids in said first and second chambers;
   first conduit means connected to said containers for transporting said actuating fluid between said containers;
   reversible pump means fluidly coupled to said first conduit means for pumping said actuating fluid from one of said containers to the other;
   second conduit means connected to said containers for transporting said balancing fluid from one container to the other;
   a fluid actuated valve in said second conduit and fluidly coupled to said first conduit;
   flow control means in said first conduit, connected in parallel with said pump means for directing said actuating fluid to said fluid actuated valve means in response to a predetermined pressure in said first conduit;
   said flow control means comprising a housing having openings at both ends thereof, said openings being connected by a channel of reduced diameter between said openings and a transverse opening in said housing communicating with said channel;

a ball member in said channel freely movable along said channel in response to fluid flow therein; and ball seats mounted in said housing at opposite ends of said channel and having central openings therethrough, said central openings terminating in conical enlargements of said opening at the ends adjacent said channel whereby said openings are selectively blocked by seating of said ball member in said conical enlargements.

2. A hydraulic balancing system for a vehicle according to claim 1 and further comprising:

a two-way relief valve connected in said first conduit and parallel with said pump means for relieving pressure in said first conduit when said pressure exceeds a predetermined pressure.

3. A hydraulic balancing system for a vehicle according to claim 2 wherein said two-way relief valve further comprises:

a housing having openings in both ends thereof and connected in parallel with said pump means in said first conduit, said housing having a channel of reduced diameter connecting said openings;

a ball member mounted in said channel and moveable therealong in response to fluid flow in said conduit;

first and second piston members, said members being slidably mounted in each of said openings at opposite ends of said channel, said piston members having a central opening therethrough, said opening terminating in a conical enlargement at the end nearest said channel, said conical recess forming a sealable seat with said ball member, said piston further having a plurality of openings extending therethrough and arranged around said central opening;

first and second plug members, one of said members being fixedly mounted in each of said openings at a predetermined distance from each end of said channel; and spring means mounted between said piston members and said plug members.

4. A hydraulic balancing system for a vehicle comprising:

an actuating fluid;

a balancing fluid having greater density than said actuating fluid;

first and second containers mounted at respective opposite ends of said vehicle for containing a portion of each of said fluids in each container;

means for separating said fluids in said containers;

first conduit means connected to said containers for transporting said actuating, fluid between said containers;

reversible pump means fluidly coupled to said first conduit means for pumping said actuating fluid from one of said containers to the other;

second conduit means connected to said containers for transporting said balancing fluid from one container to the other;

valve means, coupled to said first and second conduit means, responsive to a predetermined pressure condition in said first conduit means for gating said balancing fluid in said second conduit means;

fluid reservoir means connected in said first conduit;

first conduit means connected between one side of said pump and said reservoir;

second conduit means connected between the other side of said pump and said reservoir; and first and second normally open fluid actuated check valves connected respectively in said first and second conduits between said pump and said reservoir, said check valves allowing fluid flow from said reservoir to said pump in the normally open position.

5. A hydraulic balancing system for a vehicle according to claim 4 wherein said check valves further comprises:

a housing having a central opening therethrough said opening having first and second counter bores of progressively larger diameters and first and second shoulders at one end of each of said counter bores;

a piston slidably mounted in said first counter bore and extending into said second counter bore and having a central blind opening therein and a transverse opening through said piston intersecting said central opening at the end of said piston nearest said second counter bore;

a solid piston head at the end of said piston extending into said second counter bore, said head being of larger diameter than said first counter bore; and spring means mounted between the end of said piston opposite said head and the first counter bore.

References Cited

UNITED STATES PATENTS

| | | | |
|---|---|---|---|
| 2,963,245 | 12/1960 | Bolton | 114—125 X |
| 2,972,972 | 2/1961 | Allen | 114—16 |
| 3,343,511 | 9/1967 | Hinton et al. | 114—16 |

TRYGVE M. BLIX, *Primary Examiner.*

U.S. Cl. X.R.

114—125